United States Patent [19]

Yoshizawa

[11] 4,218,722
[45] Aug. 19, 1980

[54] COMPACT HAND-HELD DEMAGNETIZING DEVICE

[75] Inventor: Keiichi Yoshizawa, Chiba, Japan

[73] Assignee: TDK Electronics Company Limited, Tokyo, Japan

[21] Appl. No.: 956,774

[22] Filed: Nov. 1, 1978

[30] Foreign Application Priority Data

Sep. 8, 1978 [JP] Japan .................... 53-122718[U]

[51] Int. Cl.² ............................................. H01F 13/00
[52] U.S. Cl. .................................. 361/149; 361/151; 361/142
[58] Field of Search ............... 361/142, 143, 151, 155, 361/149

[56] References Cited

U.S. PATENT DOCUMENTS

| 2,528,446 | 10/1950 | McConnell | 361/149 |
| 3,038,036 | 6/1962 | Young et al. | 361/151 |
| 3,435,300 | 3/1969 | Sato | 361/149 |
| 3,626,255 | 12/1971 | Littwin | 361/149 |
| 4,086,644 | 4/1978 | Horian et al. | 361/149 |

*Primary Examiner*—J. D. Miller
*Assistant Examiner*—L. C. Schroeder
*Attorney, Agent, or Firm*—Seidel, Gonda, Goldhammer & Panitch

[57] ABSTRACT

A compact hand-held demagnetizing device is used for demagnetizing a magnetic recording and reproducing head. It comprises a handle portion and a demagnetizing head. The handle portion contains a circuit for generating a decreasing alternating current for exciting a drive coil for the demagnetizing head. Means is provided to indicate the time when the demagnetizing operation is initiated or when the demagnetizing operation can be initiated and when the demagnetizing operation is completed.

8 Claims, 10 Drawing Figures

COMPACT HAND-HELD DEMAGNETIZING DEVICE

BACKGROUND OF THE INVENTION

The present invention relates to a demagnetizing device for eliminating remnant magnetization of a magnetic recording and reproducing head and more particularly to a compact hand-held demagnetizing device.

Magnetic recording and reproducing head is composed of a magnetic material of a high magnetic permeability such as ferrites, permalloy and the like but tends to leave a small remnant magnetization under the influence of the magnetic flux from magnetic tapes, recording current, bias current and the like. The remnant magnetization can become a source of noise when sounds are reproduced from a recording medium such as a magnetic tape, resulting in reproduced sounds of low quality. To avoid this detrimental effect, it is necessary to effect periodical demagnetization of the magnetic head. In the past, it was a practice to utilize a demagnetizing apparatus which is adapted to generate an alternating current of a sufficiently high intensity and usually of a commercial frequency. The demagnetizing apparatus was brought to a location close to the magnetic head to be erased and then gradually moved off from the magnetic head, thereby to gradually attenuate the alternating magnetic field.

However, the demagnetizing or erasing head of this type is large in size and requires manual movement of the demagnetizing apparatus. This means that the demagnetizing operation requires skill and a relatively long period of time and due to the vibration caused by the commercial frequency unexpected troubles can be caused. In order to overcome these disadvantages, the inventor proposed a compact demagnetizing circuit for generating an attenuating alternating magnetic field by utilizing charging or discharging properties of a capacitor. The demagnetizing circuit is composed of a charging portion for charging the capacitor and an oscillator portion controlled by the discharge of the capacitor to generate a decreasing alternating electric current which is applied to a drive coil for a demagnetizing or erasing head.

However, the demagnetizing device of this type cannot indicate the start and the completion of the demagnetizing operation. Moreover, it is desirable to know the time when the capacitor is charged at a level exceeding a predetermined potential necessary for generating a decreasing alternating demagnetizing magnetic field whereby the operator is notified that he can start the demagnetizing operation.

SUMMARY OF THE INVENTION

A primary object of the present invention is to provide a compact portable device for demagnetizing remnant magnetization of a magnetic recording and reproducing head.

Another object of the present invention is to provide a demagnetizing device which utilizes the demagnetizing circuit mentioned above or a circuit similar thereto and further has means for indicating the start or the readiness and the completion of the demagnetizing operation thereby to make easy the manipulation and increase the utility of the present demagnetizing device.

The above objects and other objects of the present invention will be understood by making reference to the following detailed explanation.

EXPLANATION OF THE INVENTION

Figure 1:
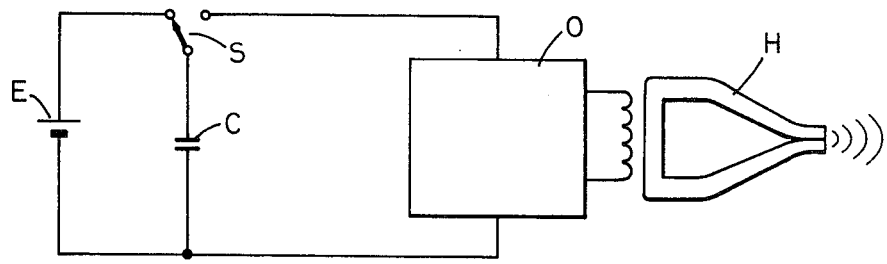
FIG. 1 is a typical circuit diagram for generating a decreasing demagnetizing magnetic field utilized in the demagnetizing or erasing device of the present invention.
Figure 10:
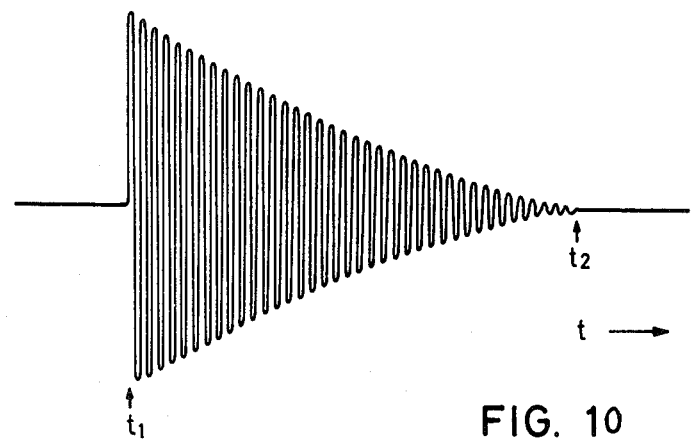
FIG. 10 is a waveform produced by the circuit in FIG. 1, FIG. 7 or FIG. 9.

Reference is made to FIG. 1 which schematically illustrates a circuit for generating a demagnetizing magnetic field. A capacitor C is adapted to be connected by a switch S to either one of an electric power source E (DC source or rectified AC source) or an oscillator O which powers a coil for a demagnetizing head H. When the switch S is on the left contact, the capacitor C is charged. When the switch S is switched to the right contact, the discharge of the capacitor powers and controls the oscillator circuit O to generate a decreasing alternating current, the waveform of which is determined by the time constant of the capacitor and the oscillator circuit. The current is passed to a drive coil of the demagnetizing head H. The resulting demagnetizing magnetic field has a waveform similar to that shown in FIG. 10.

Referring to FIGS. 2 through 6 which illustrate the first embodiment of the present invention, the demagnetizing device 1 comprises a handle portion 2 containing therein a circuit for generating a decreasing alternating electric current, and a demagnetizing head 3 made of a magnetic material of a high magnetic permeability. An electric current source for the demagnetizing device 1 is illustrated as a dry battery, though it is not intended that the electric current source is restricted to a D.C. source. A dry battery box 4 is provided for encasing the battery. Near the opposite end of the handle, a manual switch 5 and indication lamps 6 and 7 of different colours are mounted.

Figure 3:
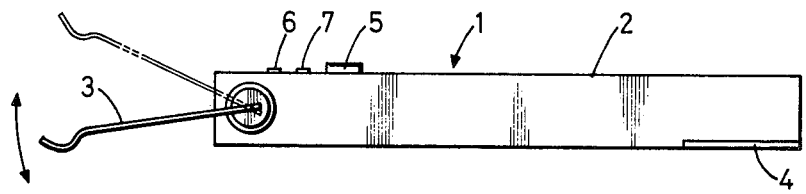
FIG. 3 is a side elevational view of the demagnetizing device illustrated in FIG. 2.
Figure 4:
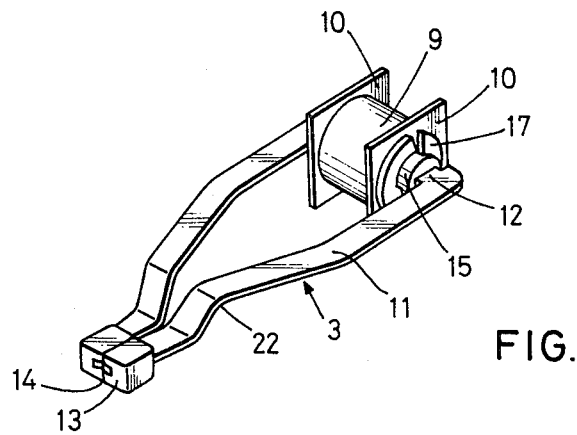
FIG. 4 is an enlarged perspective view of the demagnetizing head portion of the first embodiment.

The demagnetizing head is directly supported by one end of the handle portion 2 and a field generating or drive coil for the demagnetizing head 3 is mounted in the handle portion. The demagnetizing head 3 is pivotally supported about its support shaft or its rear leg as is shown in FIG. 4 so that it can be freely rotated therabout and can be arrested at a desired angle. FIG. 4 is an enlarged view of the demagnetizing head 3 of the demagnetizing apparatus shown in FIGS. 2 and 3 and the drive coil 9 for the demagnetizing head 3. The drive coil 9 is wound about a bobbin consisting of a hollow sleeve (not shown) and a pair of plates 10 and 10. The bottom faces of the plates 10,10 are secured to the inner bottom surface of the end of the handle portion.

The demagnetizing head 3 made of a high permeable material comprises lateral legs 11, a rear leg 12 extending through the coil 9 and connecting these lateral legs, and a tip portion 13 having a gap 14 for leaking a demagnetizing magnetic field. A rotary shaft 15 is fit in the inner bore of the sleeve of the bobbin. The rotary shaft 15 is provided with a flat groove in which the rear leg 12 of the demagnetizing head is fit and thus the rear leg 12 is integrally supported by the rotary shaft 15. A detent mechanism is used between one or both of the plates 10 and the side edge of the leg 11 where the leg 11 is jointed to the rear leg 12. This detent mechanism is composed of a detent spring member 17 placed in the space between the leg 11 and the plate 10 and mating teeth not shown notched on the outer surface of the plate 10.

Figure 5:
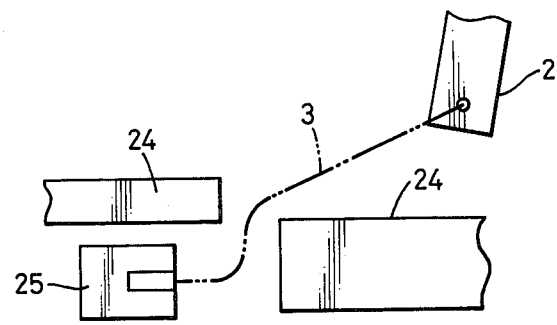
FIG. 5 is a schematic explanatory view which explains the manner of use of the device according to one embodiment of the present invention.

Referring to FIG. 4, the lateral legs 11 are first bent downwardly at 22 and then bent upwardly at an angle larger than the original direction of the leg (refer to FIG. 5). With this particular manner of bending, it is made possible to easily insert the tip 13 to a location where otherwise it would not be possible to do so.

FIG. 5 illustrates how the demagnetizing device of the present invention is used. Assuming now that a compositional member 24 of a tape deck blocks access of the demagnetizing device to a magnetic head 25 to be demagnetized, there could be a case where the tip of the demagnetizing device is not accessible to the face of the magnetic head 25 if the demagnetizing head were straight. According to the present demagnetizing head, this defect is avoided in many cases as will clearly be understood from FIG. 5.

Figure 6:
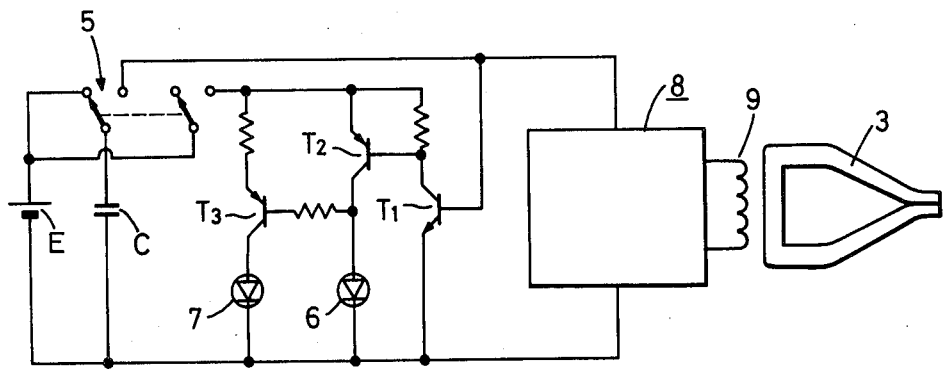
FIG. 6 is a circuit diagram according to the first embodiment of the present invention.

FIG. 6 illustrates a circuit for generating a decreasing demagnetizing magnetic field composed according to the first embodiment of the present invention. A DC current source E is connected via a normally closed contact of the manual switch 5 to a capacitor C. The source E is also connected to a indication control circuit via a normally open contact of the switch 5. The capacitor C is connected via a normally open contact of the switch to an oscillator circuit 8. The indication control circuit comprises a transistor $T_1$ having a base connected to the imput line of the oscillator circuit 8. The collector of the transistor $T_1$ is connected to the base of a second transistor $T_2$ and the emitter of this transistor is grounded. The output of the transistor $T_2$ is connected to the luminescent diode 6 (see FIGS. 2 and 3) and to the base of a third transistor $T_3$. The transistor $T_3$ has the luminescent diode 7 (see FIGS. 2 and 3) in its output circuit. The diode 6 has a different color from the diode 7. 9 is the drive coil shown in FIG. 4 which is powered from the oscillator 8. Assuming that the manual switch 5 is not pushed, the contacts of the switch are on the left side and thus a capacitor C is charged from a DC source E. After completion of the charging, the electric current will not flow any more. When the operator brings the demagnetizing head 3 into contact with a magnetic head to be demagnetized and pushes the manual switch 5, the contacts of the switch 5 are switched to the right side. Thus, the indicator control circuit is powered from the DC source E and the voltage of the capacitor C is imposed upon an oscillator 8 which generates a decreasing alternating current determined by the time constant of the capacitor C and the oscillator 8. The alternating current is then passed through a drive coil 9 of the demagnetizing head 3. The voltage of the capacitor C is also applied to the base of a transistor $T_1$ thereby make it conductive upon the operation of the switch 5. This, in turn, makes a transistor $T_2$ conductive to turn on the lamp 6. This point of time corresponds to the time $T_1$ indicated in FIG. 10 which is the start-up time of oscillation of the circuit 8. After sufficient discharge of the capacitor C, the electric potential of the capacitor becomes to substantially zero level, with the result that the transistor $T_1$ is made non-conductive and the transistor $T_2$ is also shut off thereby to turn off the lamp 6. At the same time, the lowered potential of the base of the transistor $T_3$ makes the transistor $T_3$ conductive thereby to turn on the lamp 7. Thus, the completion of the demagnetizing operation is visibly indicated (this point is the time $t_2$ in FIG. 10 when the oscillation output becomes zero).

Figure 2:
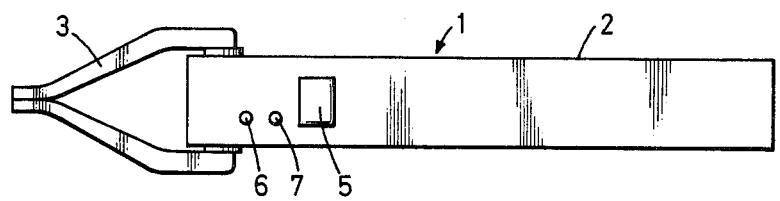
FIG. 2 is a plane view of the demagnetizing device according to an embodiment of the present invention.
Figure 7:
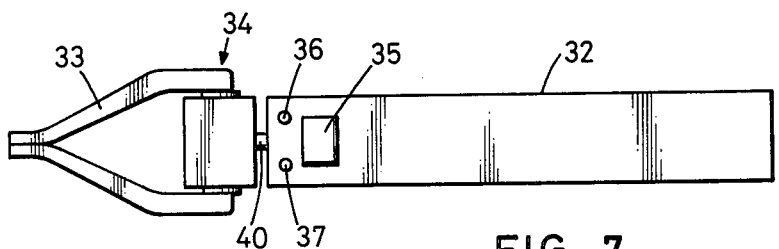
FIG. 7 is a plane view of the demagnetizing device according to the second embodiment of the present invention.
Figure 8:
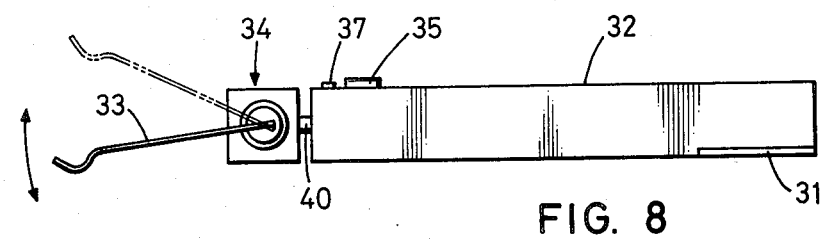
FIG. 8 is a side elevational view of the demagnetizing device in FIG. 7.

FIG. 7 is a plane view of a demagnetizing device according to the second embodiment and FIG. 8 is a side elevational view thereof. The demagnetizing device comprises a handle portion 32 in which a circuit for generating a decreasing alternating electric current is contained, and a housing 34 provided with a demagnetizing head 33 made of a high permeable magnetic material 31 is a primary cell box. Near one end of the handle opposite to the box 31 is mounted a manual switch 35 and indication lamps or luminescent diodes 36 and 37 of different colours. The only difference in shape of this device from FIGS. 2-3 is that the demagnetizing head 33 is supported by the housing 34 which is adapted to be rotated about a shaft 40.

Figure 9:
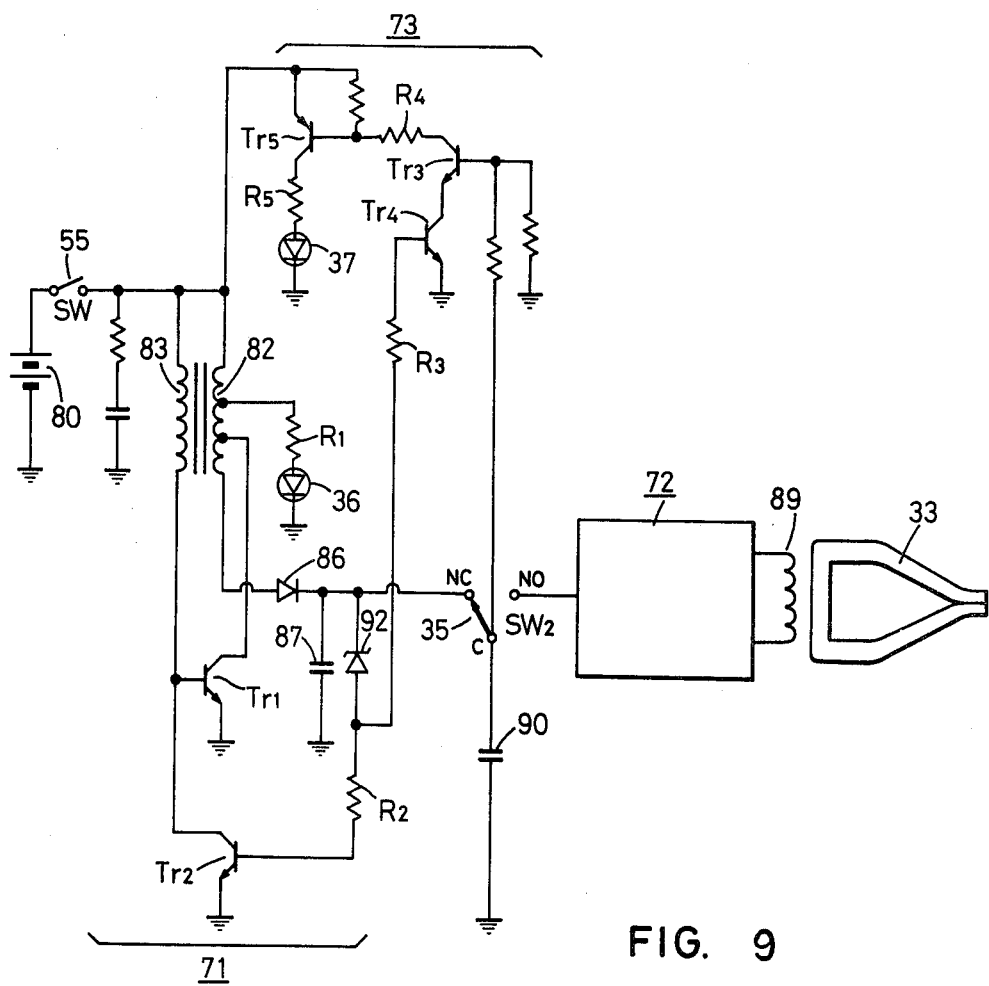
FIG. 9 is a diagram illustrating a circuit according to the second embodiment of the present invention.

Means for indicating the demagnetizing operation used in the device illustrated in FIGS. 7 and 8 is illustrated in FIG. 9, wherein a single indicating element or luminescent diode is used for indicating the time when a capacitor is charged to a predetermined maximum potential necessary for generating a decreasing alternating magnetic field and the time when the capacitor terminates the discharging (i.e., the completion of the demagnetizing operation). The charging of the capacitor is started when an electric source is switched on by a power switch SW (not shown in FIGS. 7 and 8 but shown in FIG. 9) and when it exceeds the potential level necessary for starting the demagnetizing operation the indicating lamp or luminescent diode 37 is turned on to notify the operator of the completion of the charging, so that he can start the demagnetizing operation. Thereafter, when the operator closes a manual switch 35 an alternating demagnetizing magnetic field is generated which decrease from its maximum value. When the magnetic field reaches substantially zero level (i.e., when the potential level of the capacitor reaches approximately zero), the indicating lamp 37 is turned of so that the completion of the demagnetizing operation is visually indicated. Thus, the operator is able to know whether the demagnetizing operation can surely be started and whether the demagnetizing operation has surely been completed.

The demagnetizing circuit comprises a boosting and charging circuit 71, an oscillator circuit 72 and an indication control circuit 73. A DC power source 80 is connected via a switch SW to a booster coil 82 and to the base of a transistor $Tr_1$ by way of a coil 83 which is coupled with the booster coil 82 in opposite polarity. Further, the DC power source is connected at the input side of the coil 82 to a luminescent diode 36 for indicating the power source by way of a resistor $R_1$. The output of the booster coil 82 is connected with the collector of the transistor $Tr_1$ and the emitter thereof is grounded. The loop passing through the booster coil 82 and the transistor $Tr_1$ is for generating a high voltage and the loop passing through the coil 83 to the base of the transistor $Tr_1$ is for switching. A diode 86 is connected to the booster coil 82 in parallel relation with the transistor $Tr_1$. The output of the diode 86 is connected to a parallel capacitor 87 and a Zener diode 92 and a series capacitor 90 of a large capacitance via a normally closed contact NC of a demagnetizing switch 35. The Zener diode 92 sets the maximum output voltage of the charging circuit 71. The Zener diode is connected to the base of a transistor $Tr_2$ through a resistor $R_2$ and the emitter of this transistor is grounded. The collector of this transistor is connected to the base of the transistor $Tr_1$.

The oscillator circuit 72 is an oscillator circuit for causing a demagnetizing head 33 to generate a decreasing alternating demagnetizing field which gradually reduces its amplitude from the maximum amplitude required for demagnetizing a magnetic recording and reproducing head (not shown) by using the discharging current of the capacitor 90 as its input. The capacitor 90 is connected to the oscillator circuit 72 through a normally open contact NO of the manual demagnetizing switch 35. The oscillator circuit 72 may comprise any conventional oscillator except that the amplitude of the output current decreases to zero under the control of the decreasing potential of the capacitor 90.

The indicating circuit 73 comprises a transistor $Tr_3$ having a base connected to the positive terminal of the capacitor 90, a transistor $Tr_4$ having a base connected to the Zener diode 92 via a resistor $R_3$ and a collector-emitter circuit in series with the collector-emitter circuit of the transistor $Tr_3$, a transistor $Tr_5$ connected to the collector of the transistor $Tr_3$ via a resistor $R_4$, and an indicating luminescent diode 37 connected to the collector of the transistor $Tr_5$ via a resistor $R_5$ and adapted to indicate the demagnetizing operation.

The operation of this demagnetizing system is initiated by the closure of the switch SW. The pilot luminescent diode 36 (for example "red") is turned on to indicate the connection of the DC power source. At the same time, the transistor $Tr_1$ is made conductive by the positive potential imposed on its base by the power source. The source potential is also applied to the booster coil 82 and thus a current is passed therethrough by way of the collector-emitter circuit of the transistor $Tr_1$, whereby electric energy is stored in the coil 82. When the current in the coil 82 reaches a predetermined level the reverse voltage induced in the coil 83 overcomes the voltage from the electric power source, with the result that the transistor $Tr_1$ is made non-conductive through its base. This will cause the booster coil 82 to charge the capacitors 87 and 90. The coil 83 repeats the on-off control of the transistor $Tr_1$ and thus the charging of the capacitor 90 is kept on. When the voltage at the output of the diode 86 exceeds a set level, the Zener diode 92 makes the transistor $Tr_2$ conductive through the resistor $R_2$ whereby the transistor $Tr_1$ is made non-conductive to stop the boosting operation until such time the output voltage becomes lower than the set level.

The transistor $Tr_3$ becomes conductive when the charging of the capacitor 90 is started while the transistor $Tr_4$ remains non-conductive until the lower terminal of the Zener diode 92 becomes positive. When the charging reaches the set potential level the transistor $Tr_4$ is made conductive thereby to make the transistor $Tr_5$ conductive by way of the resistor $R_4$, whereby the luminescent diode 37 (for example "green") is lighted to indicate the completion of the charging.

Then, the operator brings the demagnetizing head 33 into contact with the surface of a magnetic recording and reproducing head to be demagnetized and pushes the demagnetizing switch 35 to connect the capacitor to the normally open contact NO. The oscillator circuit starts to oscillate and applies a decreasing alternating current similar to that shown in FIG. 10 to the output transformer 89 determined by the time constant of the capacitor 90 and the oscillator circuit 72. Thus, the demagnetizing head 33 applies a decreasing demagnetizing field similar in waveform to that shown in FIG. 10 to a magnetic head to be demagnetized.

After the capacitor 90 discharges substantially all of its charge (corresponding to $t_2$ in FIG. 10), the transistor $Tr_3$ becomes non-conductive and accordingly the transistor $Tr_5$ becomes non-conductive to turn off the luminescent diode 37 which visually indicates that the demagnetizing operation is completed.

During this period, the transistor $Tr_4$ remains conductive because the output of the charging circuit 71 is at the set potential level. When the operator releases the demagnetizing switch 35 to return the movable contact from the contact NO to NC, the next charging cycle of the capacitor 90 is initiated which causes the potential of the lower terminal to go negative and thus the transistors $Tr_4$ and $Tr_2$ are made non-conductive. Thus, the luminescent diode 37 is kept off until the next charging cycle is completed.

What I claim are:

1. A compact hand-held demagnetizing device including a circuit contained in a handle portion for generating a decreasing alternating electric current, a drive coil excited by said current, a demagnetizing head extending from said handle portion and driven by said drive coil for generating a decreasing alternating demagnetizing magnetic field, and a manually operable switch for initiating the generation of said decreasing alternating current, characterized in that said device includes first luminescent means for indicating the time when the decreasing alternating current becomes substantially zero level.

2. A compact hand-held demagnetizing device according to claim 1, wherein said device includes second luminescent means responsive to said manually operable switch to indicate the start of the generation of the decreasing alternating current.

3. A compact hand-held demagnetizing device according to claim 2, wherein said circuit includes a capacitor, means for charging said capacitor, oscillator means responsive to the discharging of said capacitor to generate the decreasing alternating current, and means responsive to the discharge of said capacitor to activate the first luminescent means when the potential of said capacitor becomes substantially zero.

4. A compact hand-held demagnetizing device according to claims 1, 2 or 3, wherein said demagnetizing head is angularly adjustable with respect to said handle portion.

5. A compact hand-held demagnetizing device according to claim 4 wherein said demagnetizing head has a pair of long legs extending away from said handle portion and said legs are bent at their middle portions in one direction and then in the other direction.

6. A compact hand-held demagnetizing device according to claim 1, wherein said circuit includes a capacitor, means for charging said capacitor, oscillator means responsive to the discharging of said capacitor to generate the decreasing alternating current, means responsive to the charging of said capacitor to activate the first luminescent means when the potential of said capacitor exceed a predetermined level and means responsive to the discharge of said capacitor to deactivate said first luminescent means when the potential of said capacitor becomes substantially zero.

7. A compact hand-held demagnetizing device according to claim 6, wherein said demagnetizing head is angularly adjustable with respect to said handle portion.

8. A compact hand-held demagnetizing device according to claim 6 or 7, wherein said demagnetizing head has a pair of long legs extending away from said handle portion and said legs are bent at their middle portions in one direction and then in the other direction.

* * * * *